United States Patent
Huizen et al.

(10) Patent No.: US 12,325,360 B2
(45) Date of Patent: Jun. 10, 2025

(54) VEHICLE EXTERIOR REARVIEW MIRROR SYSTEM WITH LIGHT MODULE

(71) Applicant: Magna Mirrors of America, Inc., Holland, MI (US)

(72) Inventors: Gregory A. Huizen, Hudsonville, MI (US); Kenneth C. Peterson, Ada, MI (US); Mitchell J. Wesley, Grand Rapids, MI (US); Martin A. Hauff, Shanghai (CN)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 18/907,674

(22) Filed: Oct. 7, 2024

(65) Prior Publication Data

US 2025/0026269 A1 Jan. 23, 2025

Related U.S. Application Data

(60) Continuation of application No. 18/366,052, filed on Aug. 7, 2023, now Pat. No. 12,109,947, which is a
(Continued)

(51) Int. Cl.
*B60R 1/12* (2006.01)
*B60Q 1/26* (2006.01)
(Continued)

(52) U.S. Cl.
CPC .......... *B60R 1/1207* (2013.01); *B60Q 1/2665* (2013.01); *B60Q 1/32* (2013.01);
(Continued)

(58) Field of Classification Search
CPC ..... B60R 1/1207; F21S 43/237; F21S 43/249; F21S 43/14; B60Q 1/381; B60Q 1/2665; B60Q 1/32
(Continued)

(56) References Cited

U.S. PATENT DOCUMENTS

| | | | |
|---|---|---|---|
| 5,371,659 A | 12/1994 | Pastrick et al. | |
| 5,497,305 A | 3/1996 | Pastrick et al. | |
| (Continued) | | | |

FOREIGN PATENT DOCUMENTS

| | | |
|---|---|---|
| DE | 202008018110 U1 | 10/2011 |
| DE | 102012111313 A1 | 5/2014 |
| (Continued) | | |

OTHER PUBLICATIONS

International Search Report and Written Opinion dated Oct. 18, 2018 from corresponding PCT Application No. PCT/US2018/037215.

*Primary Examiner* — Bryon T Gyllstrom
(74) *Attorney, Agent, or Firm* — HONIGMAN LLP (57) ABSTRACT

A vehicular lighted exterior rearview mirror system includes a lighted exterior rearview mirror assembly for mounting at a side of a vehicle. A light module is disposed at the lighted exterior rearview mirror assembly. The light module includes at least three illumination sources linearly arranged at a circuit board. When the at least three illumination sources are individually actuated, light emitted by each individual illumination source is emitted outboard away from the side of the vehicle. When the at least three illumination sources are actuated responsive to a first input, the light module emits light in a first pattern. With the lighted exterior rearview mirror assembly mounted at the side of the vehicle, and when the at least three illumination sources are actuated responsive to a second input, the light module emits light in a second pattern that is different from the first pattern.

35 Claims, 11 Drawing Sheets

Related U.S. Application Data continuation of application No. 18/152,955, filed on Jan. 11, 2023, now Pat. No. 11,718,233, which is a continuation of application No. 17/662,441, filed on May 9, 2022, now Pat. No. 11,554,720, which is a division of application No. 16/622,314, filed as application No. PCT/US2018/037215 on Jun. 13, 2018, now Pat. No. 11,325,536.

(60) Provisional application No. 62/518,766, filed on Jun. 13, 2017.

(51) Int. Cl.
  *B60Q 1/32* (2006.01)
  *B60Q 1/38* (2006.01)
  *F21S 43/14* (2018.01)
  *F21S 43/237* (2018.01)
  *F21S 43/249* (2018.01)
  *F21W 103/20* (2018.01)
  *F21W 103/25* (2018.01)
  *F21Y 103/10* (2016.01)
  *F21Y 113/13* (2016.01)
  *F21Y 115/10* (2016.01)

(52) U.S. Cl.
  CPC ............. *B60Q 1/381* (2022.05); *F21S 43/14* (2018.01); *F21S 43/237* (2018.01); *F21S 43/249* (2018.01); *B60Q 2400/40* (2013.01); *B60Q 2900/40* (2022.05); *F21W 2103/20* (2018.01); *F21W 2103/25* (2018.01); *F21Y 2103/10* (2016.08); *F21Y 2113/13* (2016.08); *F21Y 2115/10* (2016.08)

(58) Field of Classification Search
  USPC .......................................................... 315/79
  See application file for complete search history.

(56) References Cited

U.S. PATENT DOCUMENTS

| | | |
|---|---|---|
| 5,497,306 A | 3/1996 | Pastrick |
| 5,669,699 A | 9/1997 | Pastrick et al. |
| 5,786,772 A | 7/1998 | Schofield et al. |
| 5,823,654 A * | 10/1998 | Pastrick ............... B60Q 1/2665 362/494 |
| 5,929,786 A | 7/1999 | Schofield et al. |
| 6,176,602 B1 | 1/2001 | Pastrick et al. |
| 6,198,409 B1 | 3/2001 | Schofield et al. |
| 6,227,689 B1 | 5/2001 | Miller |
| 6,276,821 B1 | 8/2001 | Pastrick et al. |
| 6,315,419 B1 | 11/2001 | Platzer, Jr. |
| 6,349,450 B1 | 2/2002 | Koops et al. |
| 6,511,192 B1 * | 1/2003 | Henion ................. B60Q 1/381 359/872 |
| 6,522,451 B1 | 2/2003 | Lynam |
| 6,550,103 B2 | 4/2003 | Koops et al. |
| 6,582,109 B2 | 6/2003 | Miller |
| 6,717,712 B2 | 4/2004 | Lynam et al. |
| 6,926,431 B1 * | 8/2005 | Foote ................... B60Q 1/2665 362/144 |
| 7,097,312 B2 | 8/2006 | Platzer, Jr. |
| 7,126,456 B2 | 10/2006 | Boddy et al. |
| 7,195,381 B2 | 3/2007 | Lynam et al. |
| 7,255,451 B2 | 8/2007 | McCabe et al. |
| 7,289,037 B2 | 10/2007 | Uken et al. |
| 7,492,281 B2 | 2/2009 | Lynam et al. |
| 7,581,859 B2 | 9/2009 | Lynam |
| 7,626,749 B2 | 12/2009 | Baur et al. |
| 7,748,856 B2 | 7/2010 | Zhao |
| 7,944,371 B2 | 5/2011 | Foote et al. |
| 8,058,977 B2 * | 11/2011 | Lynam .................... B60R 1/08 340/463 |
| 8,333,492 B2 * | 12/2012 | Dingman ................ B60Q 1/26 362/399 |
| 8,764,256 B2 * | 7/2014 | Foote ..................... B60Q 1/22 362/545 |
| 8,786,704 B2 | 7/2014 | Foote et al. |
| 8,801,245 B2 | 8/2014 | De Wind et al. |
| 10,480,221 B2 | 11/2019 | Cumbo |
| 10,501,966 B2 | 12/2019 | Nagata et al. |
| 11,188,094 B2 * | 11/2021 | McEnroe ............... B60Q 1/543 |
| 11,325,536 B2 | 5/2022 | Huizen et al. |
| 11,433,803 B2 | 9/2022 | Peterson |
| 11,433,816 B2 | 9/2022 | Uken et al. |
| 11,554,720 B2 | 1/2023 | Huizen et al. |
| 11,718,233 B2 | 8/2023 | Huizen et al. |
| 12,109,947 B2 | 10/2024 | Huizen et al. |
| 2006/0061008 A1 | 3/2006 | Karner et al. |
| 2006/0133103 A1 | 6/2006 | Muhlbaier et al. |
| 2007/0040664 A1 | 2/2007 | Johnson et al. |
| 2009/0073709 A1 * | 3/2009 | Yajima ................. B60R 1/1207 362/494 |
| 2009/0257240 A1 | 10/2009 | Koike |
| 2011/0157907 A1 * | 6/2011 | Hwang ................. B60R 1/1207 362/494 |
| 2011/0227487 A1 | 9/2011 | Nichol et al. |
| 2013/0130674 A1 | 5/2013 | De Wind et al. |
| 2013/0242586 A1 * | 9/2013 | Huizen ................... F21S 43/14 362/494 |
| 2019/0106051 A1 | 4/2019 | Huizen et al. |
| 2021/0146841 A1 | 5/2021 | Huizen et al. |
| 2022/0024385 A1 * | 1/2022 | Steffes ............. B29C 45/14754 |
| 2022/0242314 A1 | 8/2022 | Lin |

FOREIGN PATENT DOCUMENTS

| | | |
|---|---|---|
| DE | 102014100144 A1 | 7/2014 |
| DE | 102014015777 A1 | 4/2015 |
| DE | 102013021086 A1 | 6/2015 |
| DE | 102015101164 A1 | 7/2015 |
| EP | 1790528 A1 | 5/2007 |
| EP | 2632766 A2 | 9/2013 |
| JP | 2008189216 A | 8/2008 |

* cited by examiner

VEHICLE EXTERIOR REARVIEW MIRROR SYSTEM WITH LIGHT MODULE

CROSS REFERENCE TO RELATED APPLICATIONS

The present application is a continuation of U.S. patent application Ser. No. 18/366,052, filed Aug. 7, 2023, now U.S. Pat. No. 12,109,947, which is a continuation of U.S. patent application Ser. No. 18/152,955, filed Jan. 11, 2023, now U.S. Pat. No. 11,718,233, which is a continuation of U.S. patent application Ser. No. 17/662,441, filed May 9, 2022, now U.S. Pat. No. 11,554,720, which is a division of U.S. patent application Ser. No. 16/622,314, filed Dec. 13, 2019, now U.S. Pat. No. 11,325,536, which is a 371 national phase filing of PCT Application No. PCT/US2018/037215, filed Jun. 13, 2018, which claims the filing benefits of U.S. provisional application Ser. No. 62/518,766, filed Jun. 13, 2017, which is hereby incorporated herein by reference in its entirety.

FIELD OF THE INVENTION

The present invention relates to exterior mirrors and door handles for vehicles and, more particularly, to lighted exterior mirror assemblies or lighted exterior door handle assemblies.

BACKGROUND OF THE INVENTION

It is known to provide illumination or light sources at the side of the vehicle, such as to provide security lighting or convenience lighting at the side of the vehicle. For example, such lighting devices are described in U.S. Pat. Nos. 6,349,450; 6,550,103; 5,371,659; 5,669,699; 5,823,654 and 5,497,305, which are hereby incorporated herein by reference in their entireties. Typically, such lighting devices provide illumination along the side of the vehicle and down to the ground at the side of the vehicle.

SUMMARY OF THE INVENTION

The present invention provides an illumination module or device for a vehicle, such as for an exterior rearview mirror assembly. The illumination module provides a forward lighting and/or forward turn lighting function via a plurality of illumination sources, such as a plurality of light emitting diodes (LEDs) or the like, disposed in the illumination module. The LEDs are disposed along a circuit board and arranged to emit light generally normal to a plane of the circuit board (such as upward or downward when the circuit board and illumination module are disposed in an exterior rearview mirror assembly at a vehicle), and a light guiding element is disposed along the circuit board and LEDs and configured to direct light in a generally horizontal direction (normal to the direction in which the light is emitted), such as forward and sideward of the vehicle when the circuit board and illumination module are disposed in the exterior rearview mirror assembly at the vehicle. The LEDs are individually actuatable to provide various desired or selected patterns of light. Aspects of the mirror illumination module are also suitable for an illumination module for a door handle assembly of a vehicle.

These and other objects, advantages, purposes and features of the present invention will become apparent upon review of the following specification in conjunction with the drawings.

DESCRIPTION OF THE PREFERRED EMBODIMENTS

Figure 1:
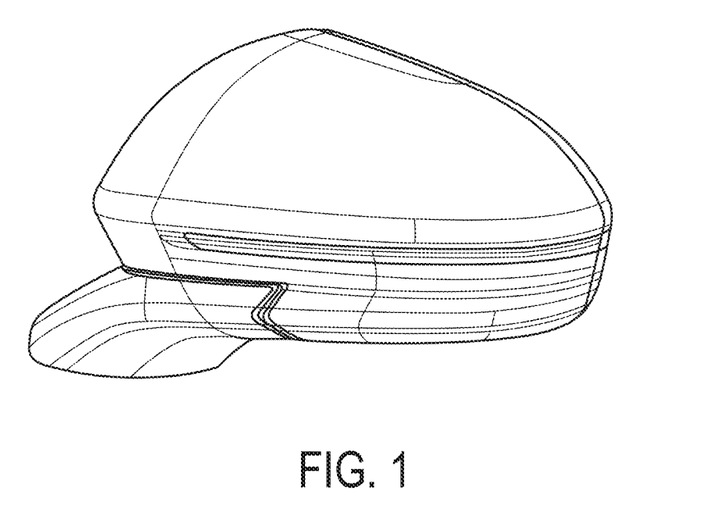
FIG. 1 is a perspective view of a vehicle exterior rearview mirror assembly having a lighting module in accordance with the present invention.
Figure 2:
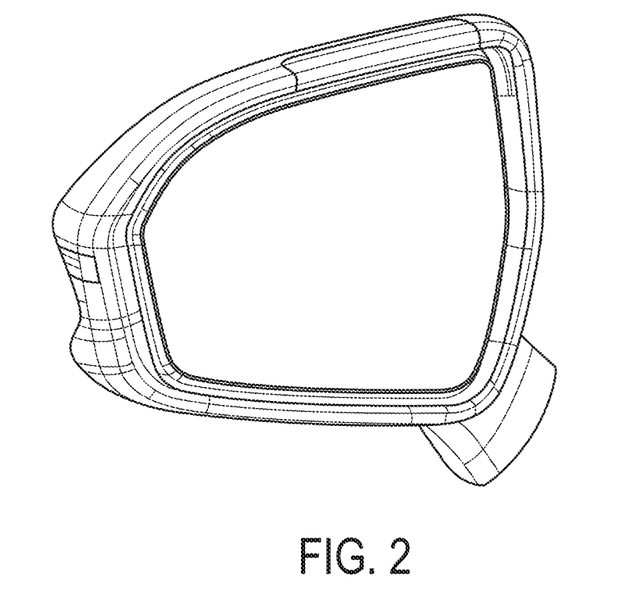
FIG. 2 is another perspective view of the vehicle exterior rearview mirror assembly of FIG. 1.
Figure 3:
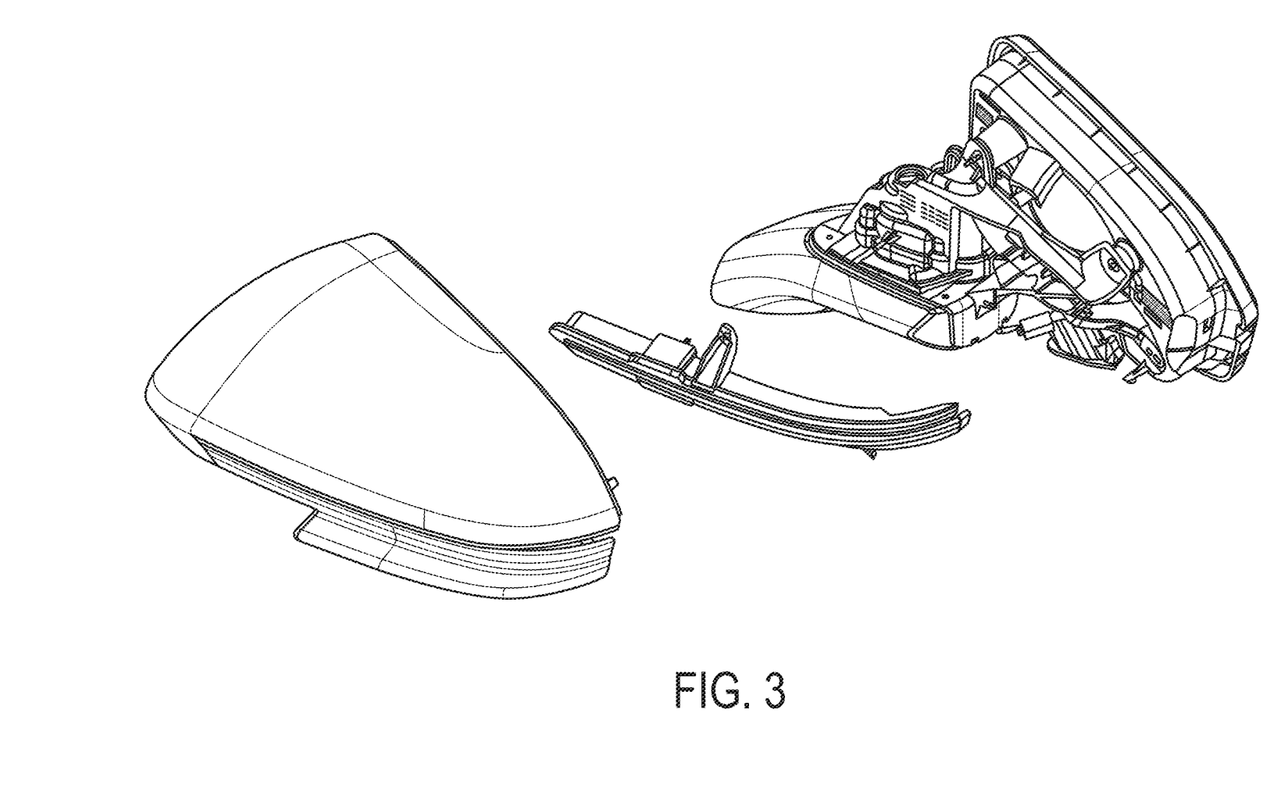
FIG. 3 is an exploded perspective view of the vehicle exterior rearview mirror assembly of FIG. 1.

Referring now to the drawings and the illustrative embodiments depicted therein, a vehicle exterior rearview mirror assembly is mountable at a door of a vehicle and includes a light module (FIGS. 1-3). The light module is disposed at or received in a recess or aperture of the mirror casing. In the illustrated embodiment, the aperture is established or formed at least partially at a forward facing portion of the mirror casing, which faces generally forward in the direction of travel of the vehicle when the exterior rearview mirror assembly 1 is normally mounted at the side of the vehicle, and extends towards or to a side portion of the mirror casing. The light module includes a plurality of forward lighting illumination sources, such as light emitting diodes or the like, and at least one turn signal indicating illumination source, such as at least one light emitting diode or the like, and the light module is configured to emit illumination in a generally forward and/or sideward and/or rearward direction when electrically powered. The forward facing illumination sources are independently and selectively energized at selected or varying intensities to provide a selectable range and intensity of illumination generally forward and/or sideward and/or rearward of the vehicle, such as in response to a user input disposed in the passenger compartment or cabin of the vehicle, as discussed below. The light module may utilize aspects of the light modules described in U.S. Pat. Nos. 8,801,245; 8,764,256 and/or 8,333,492, and/or U.S. Publication No. US-2013-0242586, which are hereby incorporated herein by reference in their entireties. The light module includes a light guiding or directing or reflecting element or reflector and a light piping and cover element or lens, which are configured to provide the desired or selected or appropriate illumination when either or both of the forward lighting illumination sources and/or the turn signal indicator illumination sources are activated or energized, as discussed below.

The light module of the present invention provides a sequential turn indicator that is a turn indicator lamp in an outside rear view mirror that lights up individual emitters in sequence to give the illusion of motion as the turn indicator flashes on and off. The purpose is to attract more attention to the signal and to add an aesthetic quality that can set an OEM apart in the market.

Because most turn indicator modules incorporated in exterior rear-view mirrors are curved in shape, the light sources are not situated in a straight line, but rather along a curve. Since most economical LED light sources use surface-mount technology, this means that if it is desired to have the LEDs pointing outward, the PCB holding the LEDs may have to comprise a flexible element, or may have to be segmented to follow the curvature of the mirror housing, with each segment connected together using wires or other means of interconnection.

Flexible or segmented PCBs would increase the cost of manufacturing the turn indicator. Therefore, the light module may comprise a single rigid PCB with the LEDs arranged along a curve, facing either straight down or straight up, with an optical element that redirects the light from a vertical direction to a horizontal (outward) direction.

FIGS. 1 and 2 show a rearview mirror with a turn signal indicator module. Most of the indicator is visible generally from the front side of the vehicle, with a small portion wrapping around the housing so it is visible from the rear side of the vehicle. This rear-facing portion is necessary to allow it to be visible to passing motorists, and is the direction toward which the majority of the light from the homologation LED is focused.

FIG. 3 shows the rearview mirror in a semi-exploded state where the housing and turn indicator module are separated from the rest of the assembly. It can be seen that the turn indicator module is somewhat curved in shape to follow the contour of the mirror housing.

Figure 4:
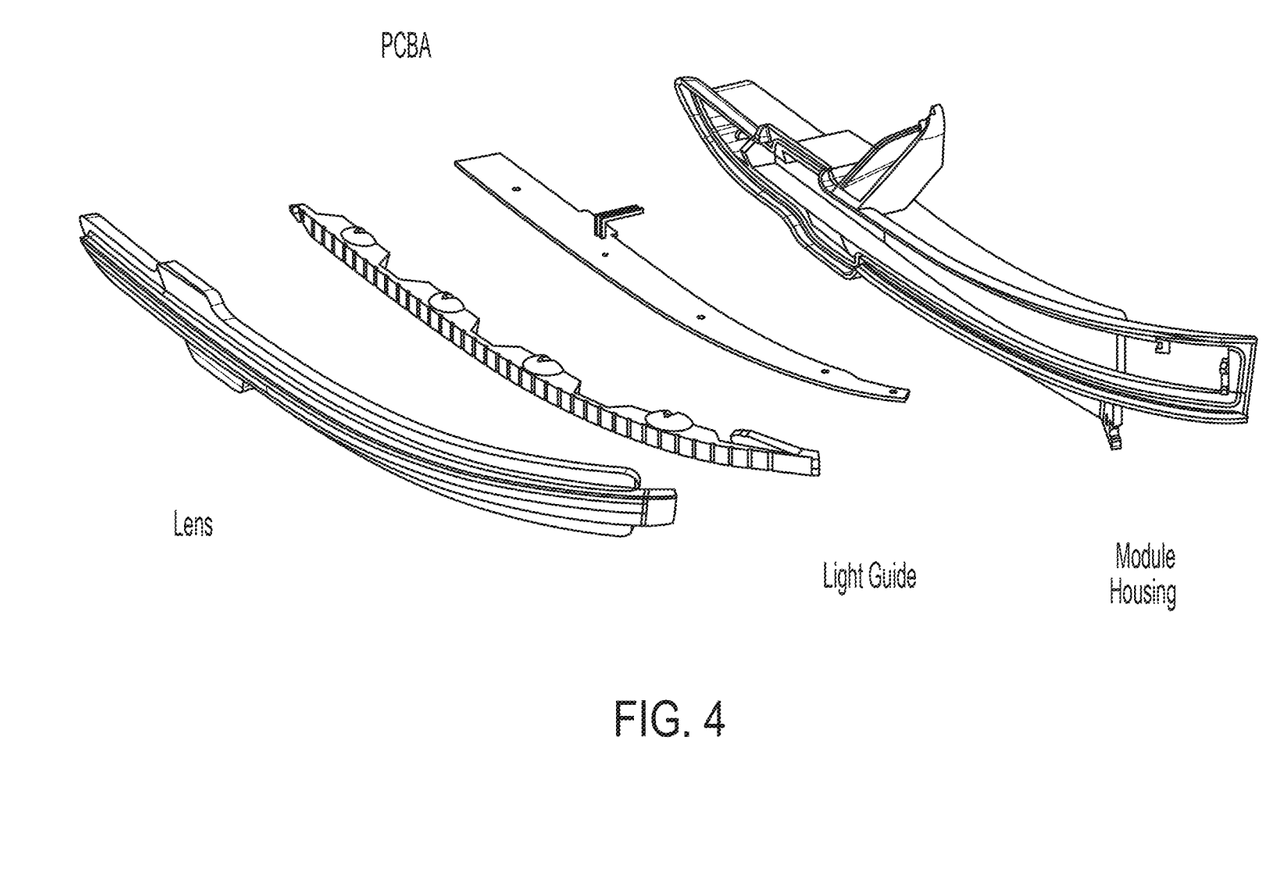
FIG. 4 is an exploded perspective view of the light module of the present invention.
Figure 5:
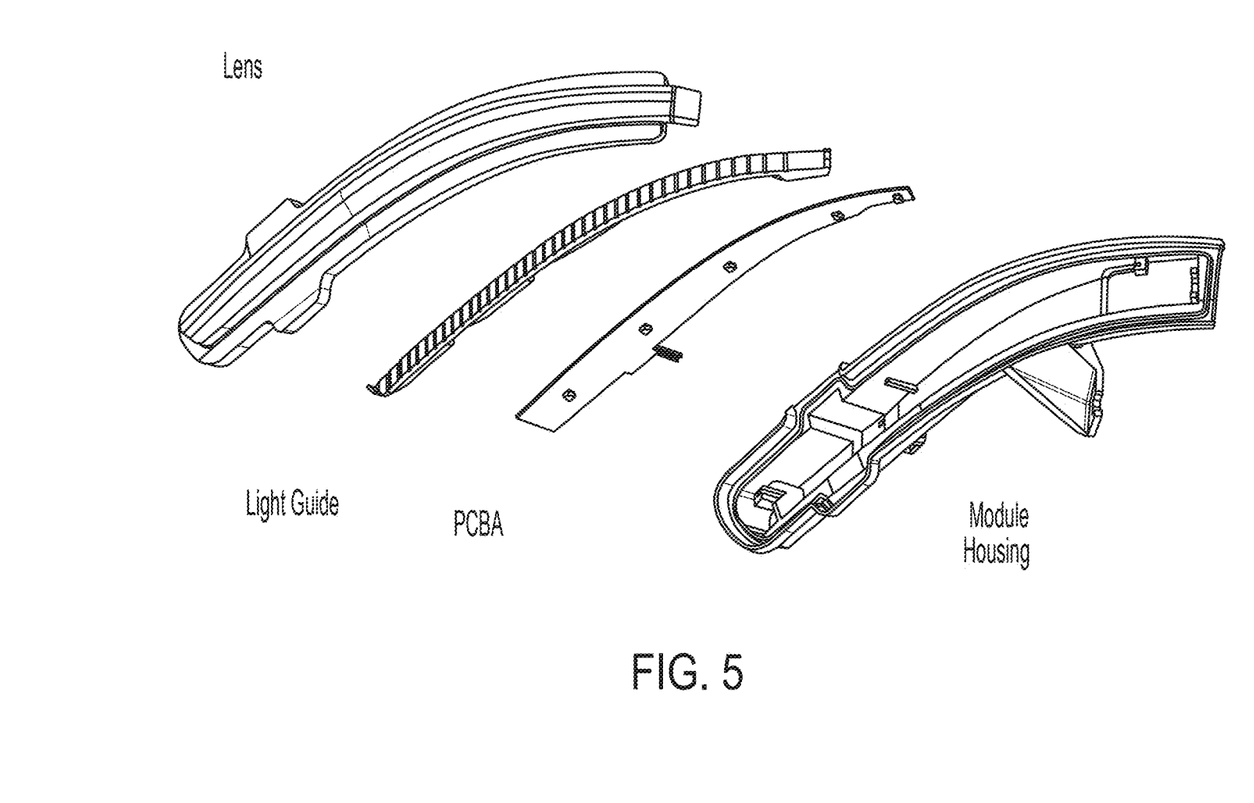
FIG. 5 is another exploded perspective view of the light module of the present invention.

FIGS. 4 and 5 show exploded views of the turn indicator module, which comprises one or more (and preferably all) of the following components:

Lens—PMMA (poly-methyl methacrylate);
Light Guide—PMMA;
PCBA—Rigid FR4 PCB with microcontroller, LEDs, LED drivers (which may comprise individual components including resistors, diodes and integrated circuits) and connector terminals (adapted for connecting to a wire harness of the mirror and/or vehicle);
Module Housing—ABS (Acrylonitrile Butadiene Styrene); and
Foam Gasket (not shown), to seal module to mirror housing to mitigate wind noise.

In the assembly, the PCBA and light guide are situated in the cavity formed between the lens and the housing. During manufacture, the lens is attached to the housing around the entire periphery using vibration or sonic welding, providing a water-tight seal for the assembly. Optionally, the lens and the light guide may comprise the same material and may be formed together to be coextensive and to provide a light guiding lens or cover element of unitary construction.

Figure 6:
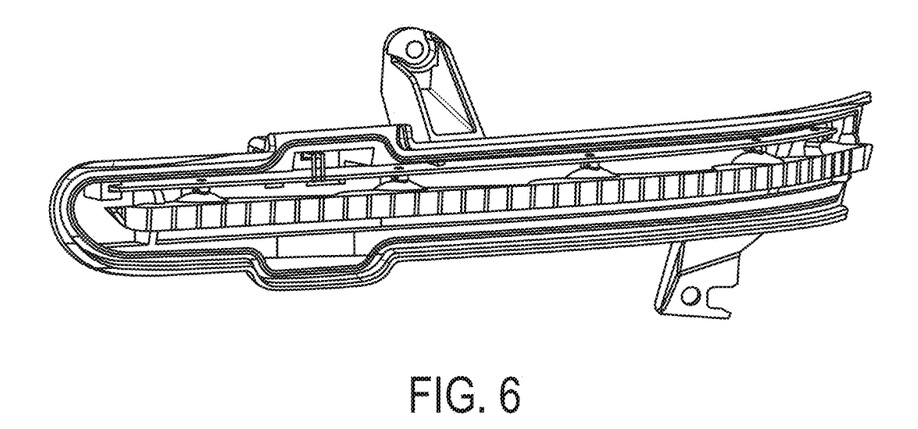
FIG. 6 is a perspective view of the light module of the present invention.

FIG. 6 shows the PCBA and light guide situated in the module housing, with the lens hidden for clarity. The individual LEDs on the PCBA are oriented in a downward direction, above the light guide, and each LED is aligned with a feature on the light guide that gathers the light and directs it outward toward the front and sides of the vehicle. This embodiment utilizes total internal reflection (TIR). If light interior to the light guide meets a smooth exterior surface of the light guide at a sufficiently shallow angle, most or all of the light will be reflected internally, guiding the light within the plastic. This is also referred to as light-piping.

Figure 7:
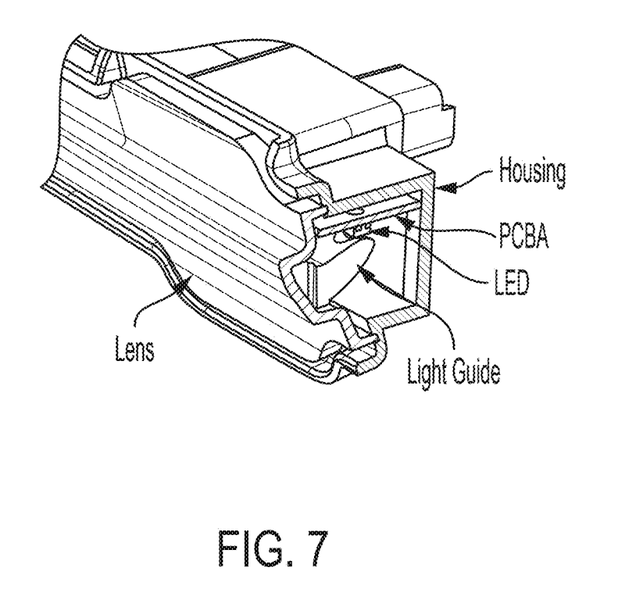
FIG. 7 is a perspective and partial sectional view of the light module of the present invention.
Figure 8:
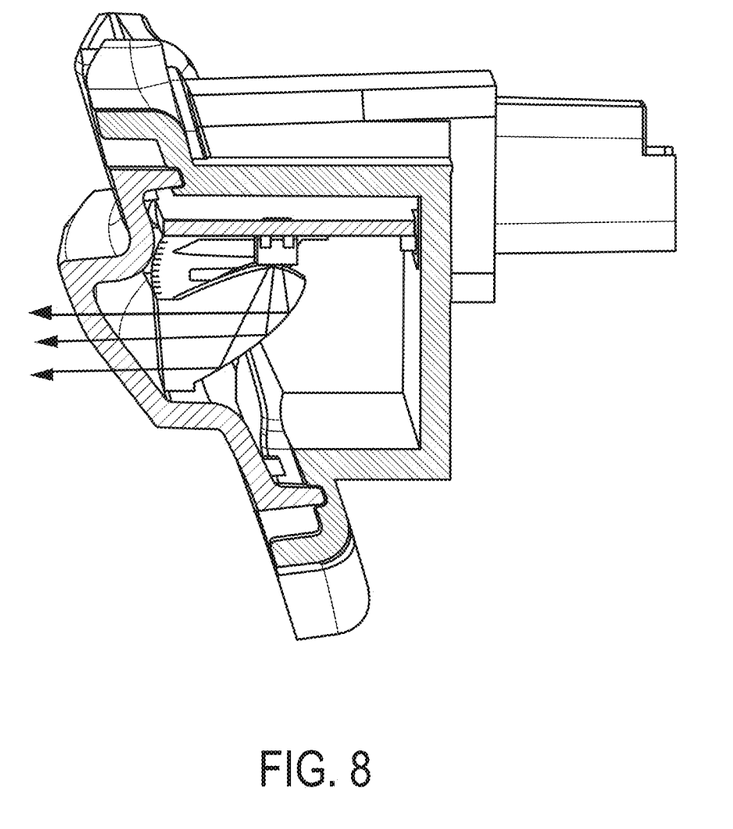
FIG. 8 is another perspective and partial sectional view of the light module of the present invention.

FIGS. 7 and 8 show a sectional view of the turn indicator module in close proximity to one of the LEDs. FIG. 8 illustrates the light path through the light guide. Light from the LED is directed down to the interior of the light guide, where it is reflected from the approximately parabolic surface of the light guide and exits through the surface of the light guide to the left in a generally horizontal direction. There is a similar section in the light guide to direct the light from homologation LED out the rearward facing end of the turn indicator.

Thus, the light module or turn signal module includes a planar circuit board and a light guiding element. The planar circuit board has an upper planar side and a lower planar side, and, with the lighted exterior rearview mirror assembly mounted at the side of the equipped vehicle and with the equipped vehicle on a ground or road surface, the upper and lower planar sides of the planar circuit board of the light module are oriented parallel to the road surface. The light module comprises a plurality of illumination sources operable to emit light, such as at least three or four (or more) linearly arranged illumination sources disposed at a mounting side (either the upper planar side or the lower planar side) of the planar circuit board. When the illumination sources are actuated, light emitted by each of the illumination sources is emitted in a direction normal to the mounting side of the planar circuit board. The light guiding element of the light module is disposed at and along at least the mounting side of the planar circuit board, and is configured so that light emitted by the illumination sources in the direction generally normal to the mounting side of the planar circuit board is redirected by the light guiding element so that light emanates from the light guiding element in a direction generally parallel to the mounting side of the planar circuit board so that the emitted light emanates from the light module generally parallel to the road surface.

Thus, and such as shown in FIGS. 7 and 8, the mounting side may be the lower planar side of the circuit board, whereby light emitted by the LEDs is generally downward, such that the light guiding element disposed at and along the lower side of the circuit board directs or redirects the emitted light (that is emitted downward) generally horizontally so that light emanating from the light guiding element and the cover element of the light module is directed or emitted generally horizontally (and forward and sideward of the vehicle). Optionally, the mounting side of the PCB may be the upper planar side, such that the light guiding element is disposed along the upper side and directs the emitted light (that is emitted upward) generally horizontally so that light emanating from the light guiding element and the cover element of the light module is directed or emitted generally horizontally (and forward and sideward of the vehicle).

Optionally, it is envisioned that the circuit board may comprise a vertically oriented circuit board, with LEDs that emit light generally horizontally, whereby a light guiding element of the light module directs or redirects the horizontally emitted light so that light emanating from the light module is directed generally vertically, such as upward or downward.

The light module includes a housing and a light transmitting cover, with the light guiding element and the planar circuit board disposed in a cavity formed by the housing and the light transmitting cover. The light guiding element and the light transmitting cover may be formed together so as to comprise a unitary construction. The planar circuit board has an edge spanning between the upper side and the lower side, and the edge comprises a curved outer edge (that may be curved to generally correspond with the contour of the exterior mirror casing), with the light guiding element curved to correspond with the curved outer edge of the planar circuit board. The light transmitting cover is curved to correspond with the curved light guiding element.

The light emitting diodes are controlled responsive to a user input in the equipped vehicle that is actuatable by a driver of the vehicle to provide illumination emanating from the light module of the exterior rearview mirror assembly. For example, the user input, when actuated by the driver of the equipped vehicle, may activate a turn signal indicator system of the equipped vehicle. Optionally, the light emitting diodes may be activated in a different pattern responsive to actuation of another user input or trigger of the equipped vehicle. The different pattern may be indicative of a door lock/unlock function or may be responsive to a signal from a key fob or the like. The activation sequence or rate of flash of the light emitting diodes may be controllable via a communication link between a vehicle body controller of the equipped vehicle and the light module. Optionally, the activation sequence or rate of flash of the light emitting diodes may vary or adjust responsive at least in part to a speed of the equipped vehicle. For example, a turn signal indication when the vehicle is stopped or traveling at a lower speed may be at a slower flash rate than a turn signal indication when the vehicle is traveling at a higher speed.

Figure 9:
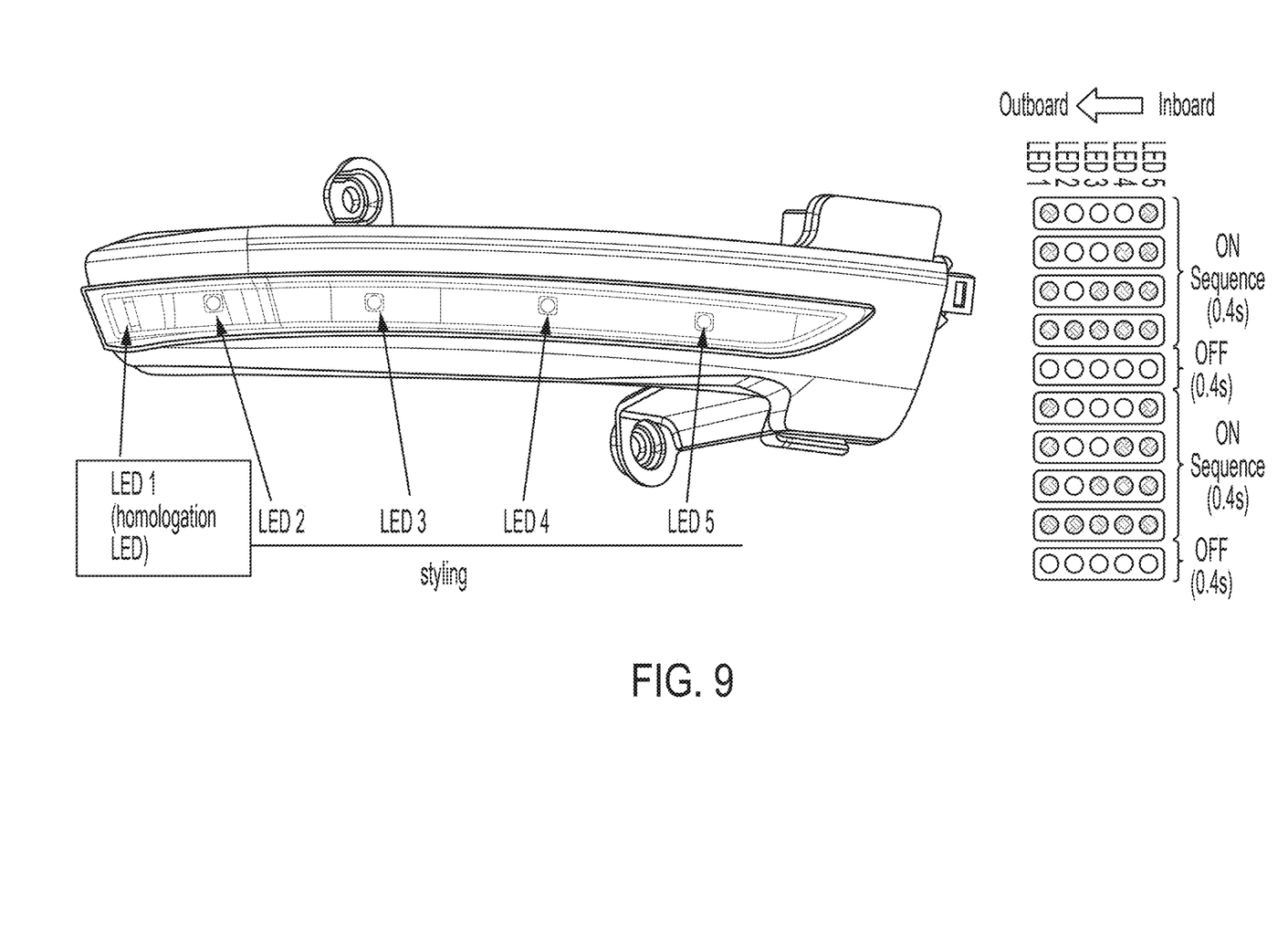
FIG. 9 is another perspective view of the light module of the present invention.
Figure 10:
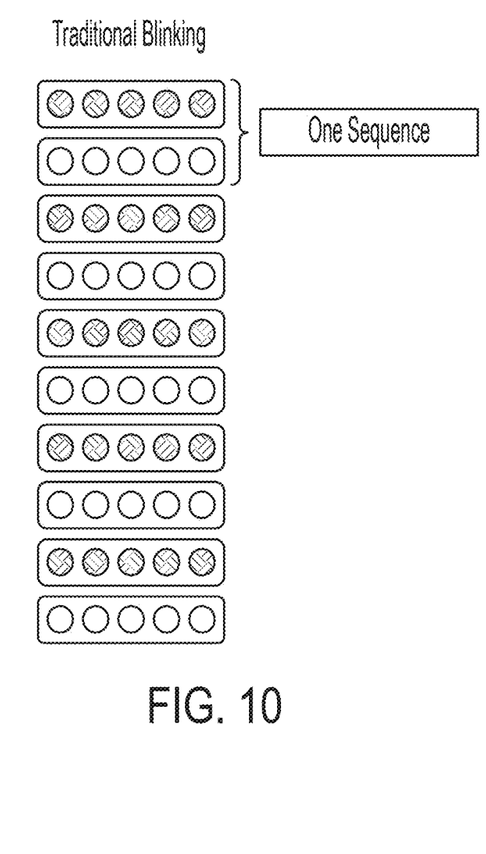
FIGS. 10-18 show various activation and deactivation patterns for the LEDs of the light module of the present invention.
Figure 11:
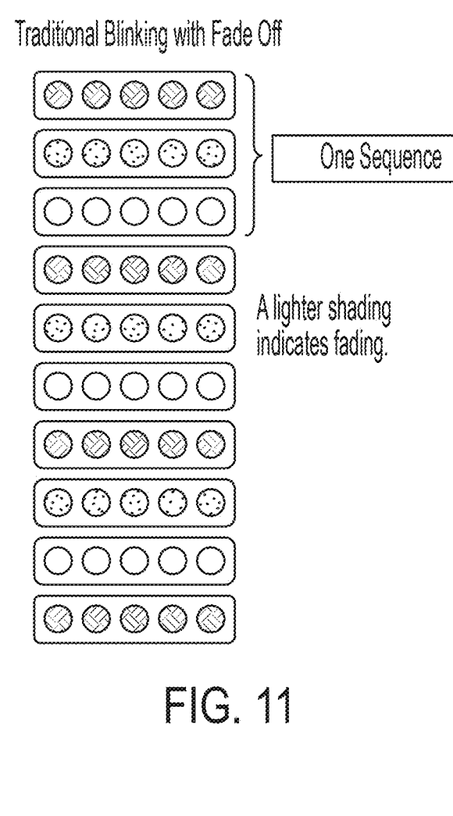
Figure 12:
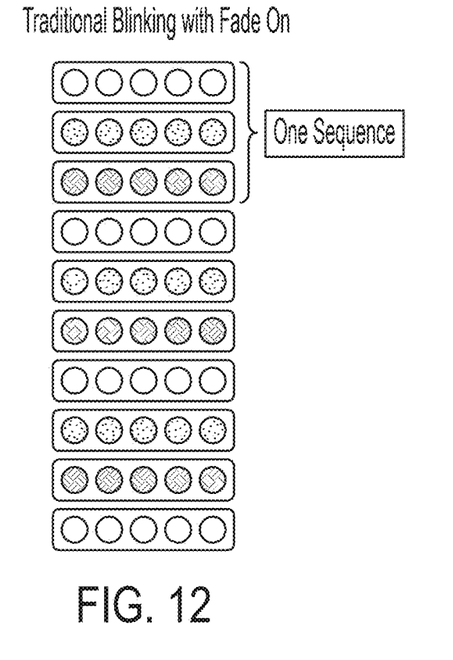
Figure 13:
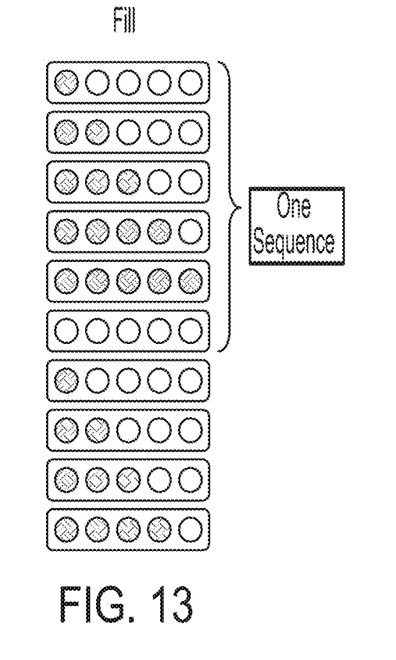
Figure 14:
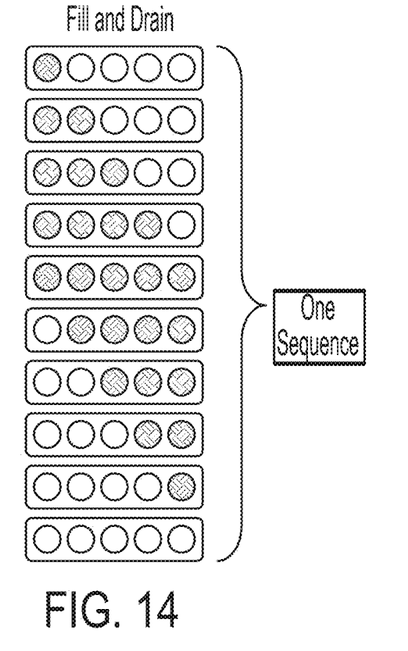
Figure 15:
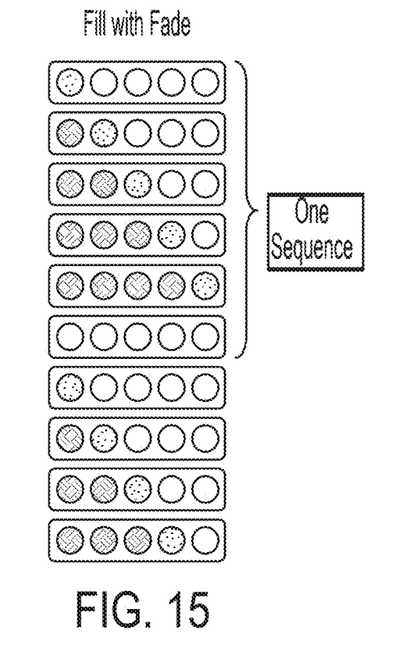
Figure 16:
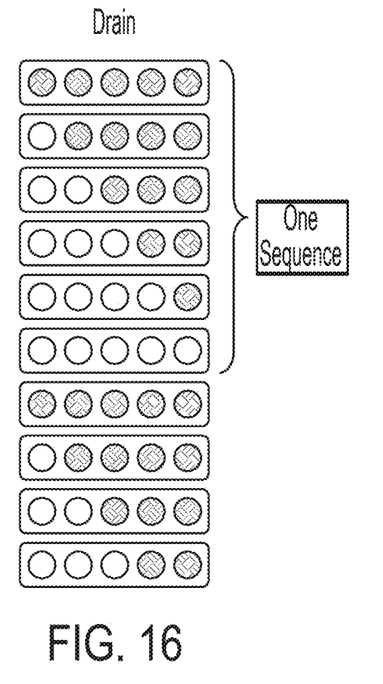
Figure 17:
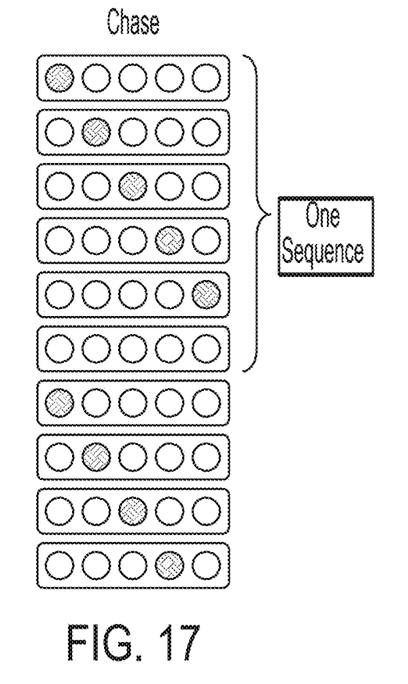
Figure 18:
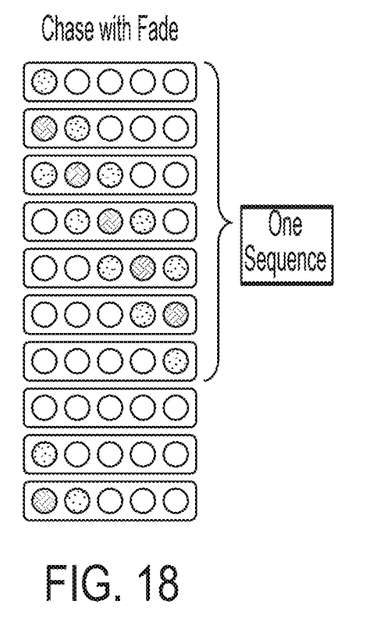

FIG. 9 shows a turn signal module such as what might be included in the exterior rear view mirror. The LED 1 is a light emitting diode (LED) that is positioned in a way to emit light to the rear and side of the vehicle, so passing vehicles may be able to see it. The remaining LEDs (LEDs 2-5) are facing mostly forward.

Turn signals flash at a rate of approximately 0.4 seconds on and 0.4 seconds off. The homologation LED needs to flash on and off at the same rate and timing as the rest of the turn signal lamps on the vehicle. The remaining LEDs (LEDs 2-5) may be lit in sequence for the desired visual effect.

The fill sequence shown in FIG. 9 can be known as a "fill" sequence. During the 0.4 seconds that the turn indicator is on, LEDs 2-5 turn on in sequence until they are all on, as if it were filling up. All of the LEDs then turn off at the same time for the off interval.

The number of LEDs in the module that take part in the sequence is not limited to four. For a smoother looking sequence, any number of LEDs may be used, such as 8 or 16 for example.

Many different types of sequences can be displayed using this array of LEDs. An OEM may select one to be used all of the time, or optionally, the OEM may provide to the end user a means to change the sequence as desired, either by preference or to correspond to different driving conditions. For example, one flash sequence may be used for high-speed driving, while a different sequence can be used when the vehicle is being driven slowly or standing still. FIGS. 10-18 show several optional flash sequences.

A microcontroller in the turn indicator module may be used to control the LED lighting sequence. In this way the turn indicator can operate somewhat autonomously and the electrical interface to the vehicle may be no different than a standard (ON-OFF) turn indicator. Alternatively, the sequence may be controlled using a body control module in another part of the vehicle, however this may result in greater complexity in the vehicle.

In the case of having an embedded microcontroller in the turn indicator module, a data communication line may also be included in the electrical interface (such as LIN, CAN or the like), which may be used to change the sequence, such as when the end user changes their vehicle preference settings, or when the driving situation changes (speed, etc.). Because the power to the turn indicator module is cycled with every flash cycle, the microcontroller may incorporate a non-volatile memory (EEPROM) to remember the sequence setting between flash cycles.

Therefore, the present invention provides a light module for sequentially lighting individual emitters in a turn indicator for an exterior rearview mirror. To reduce cost, the PCBA is oriented horizontally, with the LEDs pointed either up or down, whereby light from the LEDs (when powered) is directed out of the module horizontally by use of total internal reflection in a clear plastic light guide. Optionally, surface reflection from a more traditional metallic or metallic plated plastic reflector may be used. The homologation LED is driven directly from the power source independent of the microcontroller. This prevents total loss of primary function if there is a software error or other failure related to the microcontroller.

The flash sequence can be stored in non-volatile memory within the module, and can either be selected at manufacture, or in the field by the end user or by certain conditions such as vehicle speed, day or night, or the like. A communication line between a vehicle body controller and the turn indicator module can provide a means to change the sequence. This communication line may convey the signal via a series of pulses, or using common vehicle bus standards such as LIN or CAN. The communication line or link may comprise a wired or wireless communication link between the devices or modules or controllers.

Optionally, the exterior rearview mirror assembly may incorporate a blind spot indicator device or element and/or a turn signal indicator device or element, such as by utilizing aspects of the devices described in U.S. Pat. Nos. 8,786,704; 8,058,977; 7,944,371; 7,626,749; 7,492,281; 7,255,451; 6,198,409; 5,929,786 and/or 5,786,772, which are hereby incorporated herein by reference in their entireties. The signal indicator or indication module may include or utilize aspects of various light modules or systems or devices, such as the types described in U.S. Pat. Nos. 7,581,859; 7,289,037; 6,227,689; 6,582,109; 5,371,659; 5,497,306; 5,669,699; 5,823,654; 6,176,602 and/or 6,276,821, and/or U.S. Publication No. US-2006-0061008, and/or International Publication No. WO 2006/124682, which are hereby incorporated herein by reference in their entireties. Optionally, the exterior rearview mirror assembly may include a wide angle reflector at or integral with the reflective element, such as by utilizing aspects of the elements described in U.S. Pat. Nos. 7,748,856; 7,255,451; 7,195,381; 6,717,712; 7,126,456; 6,315,419; 7,097,312 and/or 6,522,451, which are hereby incorporated herein by reference in their entireties.

Optionally, the exterior rearview mirror assembly may also comprise a ground illumination light or puddle lamp, which provides downward directed illumination (and which may provide a back lit icon or indicia or logo or the like), such as by utilizing aspects of the illumination systems described in U.S. Pat. Nos. 8,764,256; 8,333,492; 5,371,659, 5,669,699, 5,823,654 and/or 5,497,305, which are hereby incorporated herein by reference in their entireties. Optionally, the illumination module may comprise a cornering light and a puddle lamp and turn signal light, and may have a wrap-around style turn signal at the exterior mirror that may be fitted with a prism lens or the like to project light in the appropriate direction and/or toward the targeted location. The illumination module thus may include one or more illumination sources and one or more lenses or optics or light pipes or the like to distribute or direct illumination toward the appropriate targeted areas.

Optionally, a light module in accordance with the present invention may be disposed at a door handle of the vehicle, such that an LED light strip is disposed within an exterior vehicle door handle and emits a sequential light pattern or other light pattern.

Vehicles today are equipped with lighting features enclosed in the door handle, head lights, and tail lights. These lighting features can be used as welcome features, aesthetics, safety features, or for vehicle-driver feedback. Door handles may contain light pipes, pocket lights, and other LED light strips. Furthermore, head lights and tail lights can be programmed to produce flashing or fading on/off patterns and day running lights (DLR).

In one embodiment of the present invention, vehicular feedback to the driver is enhanced when certain actions are performed by the driver such as locking/unlocking the doors. Another embodiment of the present invention may distinguish the sequential door handle from other door handles on the market by creating new innovative lighting features and improving vehicle aesthetics.

Figure 19:
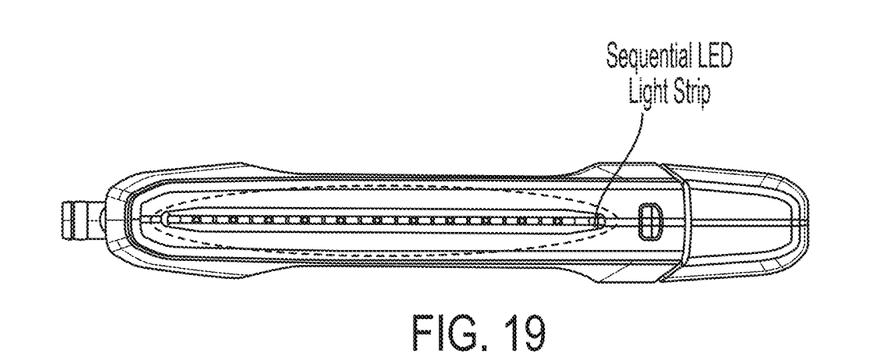
FIG. 19 is a plan view of a door handle assembly for a vehicle, with a sequential LED light strip disposed therein in accordance with the present invention.
Figure 20:
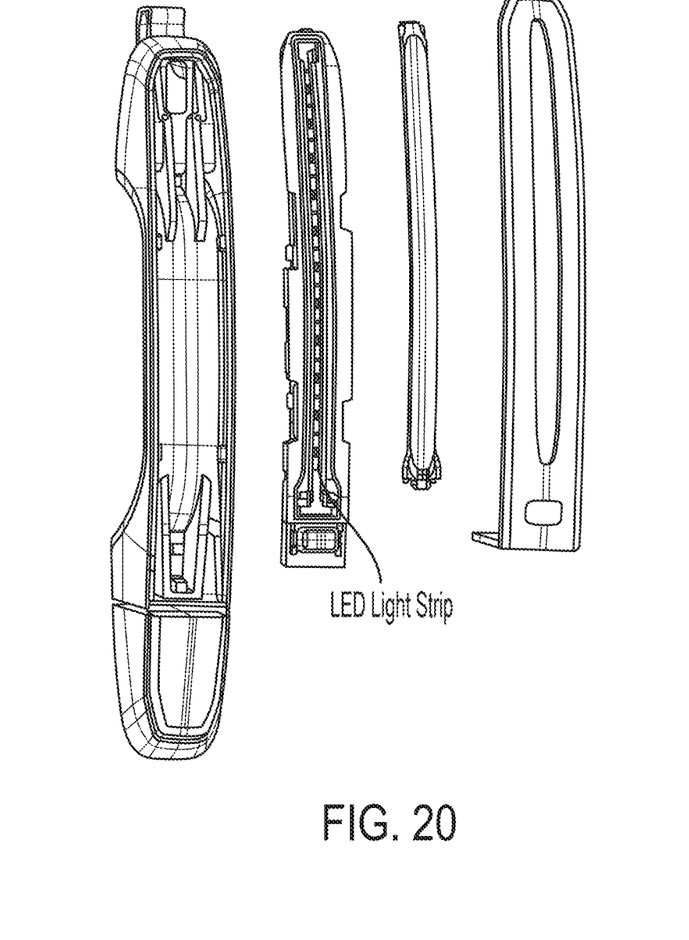
FIG. 20 is an exploded perspective view of the door handle assembly and light strip of FIG. 19.

FIG. 19 shows a fully assembled view of the LED light strip in a door handle. The LED light strip is contained within the handle. FIG. 20 shows an exploded view of the LED light strip within a handle. The LED light strip emits light outward, away from the vehicle. The LED light strip emits a sequential light pattern outward from the vehicle after certain actions are performed by the driver. The light strip is enclosed or contained within the door handle. The sequential lighting feature can be used to enhance a vehicle's welcome feature, aesthetics, safety features, or vehicle-driver feedback. The LEDs are sequentially powered to provide a desired pattern of emitting light, and may comprise white LEDs or other single color LEDs, or the LEDs of the light strip may comprise multiple colored LEDs, depending on the particular application of the door handle light module.

Optionally, the sequential lighting feature of the door handle may provide a turn signal indicator at the side of the vehicle, such as for applications where an exterior mirror is not present (where a camera system may provide rearward and sideward views for object detection or the like, such as may be incorporated in a fully autonomous vehicle or the like) or where a sufficiently large exterior mirror (that is large enough to house a turn signal indicator) is not present. The door handle indicator may function independent of the mirror indicator or the two indicators (if both a mirror indicator and door handle indicator are present at a side of the vehicle) may operate together to provide sequential activation of the LEDs of the mirror indicator followed by (or preceded by) sequential (such as front to rear, or rear to front if preceding the mirror indicator activation) activation of the LEDs of the door handle indicator.

During operation of the door handle light module, the sequence could start from the outer LEDs and 'collide' at the center or from the center out. Optionally, the door handle may provide or include a 'pocket light' where the light strip with two or more LEDs is inside the door handle strap such that it illuminates the 'pocket' of the door sheet metal. Optionally, the door handle pocket light may have colored LEDs or an RGB (red-blue-green) LED that can emit different colors for indicating things to the driver (like lock/unlock, such as, for example, red to indicate the door has been locked and green to indicate that the door is unlocked). Optionally, a microcontroller may be disposed inside the door handle to control the sequence, which would allow the user/driver to change the appearance or pattern of the door handle sequence/color by pushing and holding the lock button for a certain amount of time (more than typical for just locking the handle). Such a reconfigurable or programmable or customizable lighting pattern may be a nested/hidden function. Optionally, the light module may actuate its LEDs in patterns that may indicate codes or the like, such as by energizing a particular number of the LEDs. Optionally, the number of LEDs energized may be indicative of a battery level in an Electric vehicle or the like.

The sequential door handle light feature thus comprises an LED strip that emits light in a sequential pattern when certain vehicular actions are performed by the driver such as locking/unlocking the doors. The sequential door handle thus improves the feedback that the driver receives when certain basic car functions are performed. The sequential door handle also provides an aesthetically pleasing door handle feature for the driver that is distinct from what is currently on the market.

The lighted exterior door handle system includes a light module disposed at a lighted exterior door handle assembly. The light module includes a circuit board and a plurality of illumination sources (such as a plurality of light emitting diodes, such as a plurality of linearly arranged light emitting diodes) operable to emit light. When the illumination sources are actuated, light emitted by each of the illumination sources is emitted outboard away from the door of the equipped vehicle. When the door of the equipped vehicle is unlocked, the light module emits light in a first pattern, and when the door of the equipped vehicle is locked, the light module emits light in a second pattern that is different from the first pattern. The light module may emit the first and second patterns of light responsive to a signal from a remote device, such as a key fob or smart phone or the like. The different patterns of light are provided by changing the actuation sequence of the light emitting diodes or the color of light emitted by the light emitting diodes or flash rate of the light emitting diodes or the like.

The light module comprises a housing and a light transmitting cover, and the circuit board is disposed in a cavity formed by the housing and the light transmitting cover. The light emitting diodes are individually electrically controllable to provide a desired pattern of illumination. Optionally, the light emitting diodes may be controlled responsive to a user input in the equipped vehicle that is actuatable by a driver or occupant of the equipped vehicle to provide illumination emanating from the light module of the exterior door handle assembly. The user input may be actuatable to activate a turn signal indicator system of the equipped vehicle, whereby, responsive to actuation of the user input to activate the turn signal indicator system of the equipped vehicle, the light emitting diodes are actuated to emit light in a third pattern that is different from the first pattern and different from the second pattern. Optionally, the light emitting diodes may be activated to emit light in a fourth pattern responsive to actuation of another user input or trigger of the equipped vehicle, with the fourth pattern being different from each of the first, second and third patterns.

Optionally, the light emitting diodes may be activated in a different pattern responsive to actuation of another user input or trigger of the equipped vehicle. The different pattern may be indicative of a turn signal function or a security system function or may be responsive to a signal from a key fob or the like. The activation sequence or rate of flash of the light emitting diodes may be controllable via a communication link between a vehicle body controller of the equipped vehicle and the light module. Optionally, the activation sequence or rate of flash of the light emitting diodes may vary or adjust responsive at least in part to a speed of the equipped vehicle. For example, a turn signal indication when the vehicle is stopped or traveling at a lower speed may be at a slower flash rate than a turn signal indication when the vehicle is traveling at a higher speed.

Optionally, a user's smart phone or other mobile device may use an app that can be used as the primary interface for configuration options for the light module. For example, such an app would not only simplify the creation of user interfaces for configuring and customizing various features on the vehicle, it would also provide an important relationship link back to the end consumer. This relationship link can then be used to feed important industry developments, technologies or aftermarket product information to customers, as well as providing the opportunity to deliver additional services into the future.

Lighting is an excellent feature for offering all manner of customization and personalization, and offers just enough functionality for introducing an app that can customize the vehicle. Optionally, such an app may also be used to profile the customer and transfer personalization options between vehicles.

Changes and modifications to the specifically described embodiments may be carried out without departing from the principles of the present invention, which is intended to be limited only by the scope of the appended claims as interpreted according to the principles of patent law.

The invention claimed is:

1. A vehicular lighted exterior rearview mirror system, the vehicular lighted exterior rearview mirror system comprising:
   a lighted exterior rearview mirror assembly configured for mounting at a side of a vehicle equipped with the vehicular lighted exterior rearview mirror system;
   a light module disposed at the lighted exterior rearview mirror assembly;
   wherein the light module comprises a circuit board;
   wherein the light module comprises at least three illumination sources linearly arranged at the circuit board, and wherein the at least three illumination sources are individually operable to emit light;
   wherein, with the lighted exterior rearview mirror assembly mounted at the side of the equipped vehicle, and when the at least three illumination sources are individually actuated to emit light, light emitted by each individual illumination source of the at least three illumination sources is emitted outboard away from the side of the equipped vehicle;
   wherein, with the lighted exterior rearview mirror assembly mounted at the side of the equipped vehicle, and when the at least three illumination sources are actuated responsive to a first input, the light module emits light in a first pattern; and
   wherein, with the lighted exterior rearview mirror assembly mounted at the side of the equipped vehicle, and when the at least three illumination sources are actuated responsive to a second input, the light module emits light in a second pattern that is different from the first pattern.

2. The vehicular lighted exterior rearview mirror system of claim 1, wherein the first input is responsive to a door of the equipped vehicle being unlocked, and wherein the second input is responsive to the door of the equipped vehicle being locked.

3. The vehicular lighted exterior rearview mirror system of claim 1, wherein the first input comprises a user input of the equipped vehicle that is actuatable by a driver of the equipped vehicle to activate a turn signal indicator system of the equipped vehicle.

4. The vehicular lighted exterior rearview mirror system of claim 3, wherein, with the lighted exterior rearview mirror assembly mounted at the side of the equipped vehicle, and when the at least three illumination sources are actuated to emit light responsive to actuation of the user input, an operation sequence of the individual illumination sources of the at least three illumination sources is varied between at least a first operation sequence and a second operation sequence based at least in part on movement of the equipped vehicle.

5. The vehicular lighted exterior rearview mirror system of claim 4, wherein the operation sequence of the individual illumination sources of the at least three illumination sources is varied between the first operation sequence when the vehicle is not moving and the second operation sequence when the vehicle is moving.

6. The vehicular lighted exterior rearview mirror system of claim 4, wherein the operation sequence of the individual illumination sources of the at least three illumination sources is varied between the first operation sequence when the vehicle is moving at a slower speed and the second operation sequence when the vehicle is moving at a higher speed that is higher than the slower speed.

7. The vehicular lighted exterior rearview mirror system of claim 1, wherein an operation sequence of the individual illumination sources of the at least three illumination sources is controlled via a controller of the equipped vehicle.

8. The vehicular lighted exterior rearview mirror system of claim 1, wherein the first input comprises an input based on a charge level of a battery of the equipped vehicle, and wherein, with the lighted exterior rearview mirror assembly mounted at the side of the equipped vehicle, the light module is operable to indicate the charge level of the battery of the equipped vehicle.

9. The vehicular lighted exterior rearview mirror system of claim 8, wherein the second pattern is programmable by a user.

10. The vehicular lighted exterior rearview mirror system of claim 8, wherein the second input is responsive to a door of the equipped vehicle being unlocked.

11. The vehicular lighted exterior rearview mirror system of claim 10, wherein, with the lighted exterior rearview mirror assembly mounted at the side of the equipped vehicle, and when the at least three illumination sources are electrically actuated with the door of the equipped vehicle locked, the light module emits light in a third pattern that is different from the first pattern and that is different from the second pattern.

12. The vehicular lighted exterior rearview mirror system of claim 11, wherein the different second and third patterns of light are provided by at least one selected from the group consisting of (i) changing an actuation sequence of the at least three illumination sources and (ii) changing color of light emitted by the at least three illumination sources.

13. The vehicular lighted exterior rearview mirror system of claim 8, wherein the second input comprises a user input of the equipped vehicle that is actuatable by a driver of the equipped vehicle to activate a turn signal indicator system of the equipped vehicle.

14. The vehicular lighted exterior rearview mirror system of claim 1, wherein the different first and second patterns of light are provided by at least one selected from the group consisting of (i) changing an actuation sequence of the at least three illumination sources and (ii) changing color of light emitted by the at least three illumination sources.

15. The vehicular lighted exterior rearview mirror system of claim 1, wherein the light module comprises a housing and a light transmitting cover, and wherein the circuit board is disposed in a cavity between the housing and the light transmitting cover.

16. The vehicular lighted exterior rearview mirror system of claim 1, wherein the circuit board has circuitry established thereat, and wherein the circuitry comprises (i) the at least three illumination sources, (ii) electrical drivers for the at least three illumination sources and (iii) connector terminals.

17. The vehicular lighted exterior rearview mirror system of claim 1, wherein the at least three illumination sources comprise at least three light emitting diodes.

18. The vehicular lighted exterior rearview mirror system of claim 1, wherein the individual illumination sources of the at least three illumination sources are individually actuated to provide a desired pattern of illumination.

19. A vehicular lighted exterior rearview mirror system, the vehicular lighted exterior rearview mirror system comprising:
a lighted exterior rearview mirror assembly configured for mounting at a side of a vehicle equipped with the vehicular lighted exterior rearview mirror system;
a light module disposed at the lighted exterior rearview mirror assembly;
wherein the light module comprises a circuit board;
wherein the light module comprises at least three illumination sources linearly arranged at the circuit board, and wherein the at least three illumination sources are individually operable to emit light;
wherein the at least three illumination sources comprise at least three light emitting diodes;
wherein, with the lighted exterior rearview mirror assembly mounted at the side of the equipped vehicle, and when the at least three illumination sources are individually actuated to emit light, light emitted by each individual illumination source of the at least three illumination sources is emitted outboard away from the side of the equipped vehicle;
wherein, with the lighted exterior rearview mirror assembly mounted at the side of the equipped vehicle, and when the at least three illumination sources are actuated responsive to a first input, the light module emits light in a first pattern;
wherein, with the lighted exterior rearview mirror assembly mounted at the side of the equipped vehicle, and when the at least three illumination sources are actuated responsive to a second input, the light module emits light in a second pattern that is different from the first pattern;
wherein the first input comprises an input based on a charge level of a battery of the equipped vehicle, and wherein, with the lighted exterior rearview mirror assembly mounted at the side of the equipped vehicle, the light module is operable to indicate the charge level of the battery of the equipped vehicle; and
wherein the second input comprises a user input of the equipped vehicle that is actuatable by a driver of the equipped vehicle to activate a turn signal indicator system of the equipped vehicle.

20. The vehicular lighted exterior rearview mirror system of claim 19, wherein, with the lighted exterior rearview mirror assembly mounted at the side of the equipped vehicle, and when the at least three illumination sources are electrically actuated with a door of the equipped vehicle locked, the light module emits light in a third pattern that is different from the first pattern and that is different from the second pattern.

21. The vehicular lighted exterior rearview mirror system of claim 20, wherein, with the lighted exterior rearview mirror assembly mounted at the side of the equipped vehicle, and when the at least three illumination sources are electrically actuated with the door of the equipped vehicle unlocked, the light module emits light in a fourth pattern that is different from the first pattern and that is different from the second pattern and that is different from the third pattern.

22. The vehicular lighted exterior rearview mirror system of claim 19, wherein the light module comprises a housing and a light transmitting cover, and wherein the circuit board is disposed in a cavity between the housing and the light transmitting cover.

23. The vehicular lighted exterior rearview mirror system of claim 19, wherein the circuit board has circuitry established thereat, and wherein the circuitry comprises (i) the at least three illumination sources, (ii) electrical drivers for the at least three illumination sources and (iii) connector terminals.

24. The vehicular lighted exterior rearview mirror system of claim 19, wherein the individual illumination sources of the at least three illumination sources are individually actuated.

25. A vehicular lighted exterior rearview mirror system, the vehicular lighted exterior rearview mirror system comprising:
a lighted exterior rearview mirror assembly configured for mounting at a side of a vehicle equipped with the vehicular lighted exterior rearview mirror system;
a light module disposed at the lighted exterior rearview mirror assembly;
wherein the light module comprises a circuit board;
wherein the light module comprises at least three illumination sources linearly arranged at the circuit board, and wherein the at least three illumination sources are individually operable to emit light;
wherein the at least three illumination sources comprise at least three light emitting diodes;
wherein, with the lighted exterior rearview mirror assembly mounted at the side of the equipped vehicle, and when the at least three illumination sources are individually actuated to emit light, light emitted by each individual illumination source of the at least three illumination sources is emitted outboard away from the side of the equipped vehicle;
wherein, with the lighted exterior rearview mirror assembly mounted at the side of the equipped vehicle, and when the at least three illumination sources are actuated responsive to a first input, the light module emits light in a first pattern;
wherein, with the lighted exterior rearview mirror assembly mounted at the side of the equipped vehicle, and when the at least three illumination sources are actuated responsive to a second input, the light module emits light in a second pattern that is different from the first pattern; and
wherein the first pattern of light at least one selected from the group consisting of (i) has a first actuation sequence of the at least three illumination sources that is different than a second actuation sequence of the at least three illumination sources for the second pattern of light and (ii) has a first color of light emitted by the at least three illumination sources that is different than a second color of light emitted by the at least three illumination sources for the second pattern of light.

26. The vehicular lighted exterior rearview mirror system of claim 25, wherein the first input is responsive to a door of the equipped vehicle being unlocked, and wherein the second input is responsive to the door of the equipped vehicle being locked.

27. The vehicular lighted exterior rearview mirror system of claim 25, wherein the first input comprises a user input of the equipped vehicle that is actuatable by a driver of the equipped vehicle to activate a turn signal indicator system of the equipped vehicle.

28. The vehicular lighted exterior rearview mirror system of claim 27, wherein, with the lighted exterior rearview mirror assembly mounted at the side of the equipped vehicle, and when the at least three illumination sources are actuated to emit light responsive to actuation of the user input, an operation sequence of the individual illumination sources of the at least three illumination sources is varied between at least a first operation sequence and a second operation sequence based at least in part on movement of the equipped vehicle.

29. The vehicular lighted exterior rearview mirror system of claim 28, wherein the operation sequence of the individual illumination sources of the at least three illumination sources is varied between the first operation sequence when the vehicle is not moving and the second operation sequence when the vehicle is moving.

30. The vehicular lighted exterior rearview mirror system of claim 28, wherein the operation sequence of the individual illumination sources of the at least three illumination sources is varied between the first operation sequence when the vehicle is moving at a slower speed and the second operation sequence when the vehicle is moving at a higher speed that is higher than the slower speed.

31. The vehicular lighted exterior rearview mirror system of claim 25, wherein the first input comprises an input based on a charge level of a battery of the equipped vehicle, and wherein, with the lighted exterior rearview mirror assembly mounted at the side of the equipped vehicle, the light module is operable to indicate the charge level of the battery of the equipped vehicle.

32. The vehicular lighted exterior rearview mirror system of claim 31, wherein the second input is responsive to a door of the equipped vehicle being unlocked.

33. The vehicular lighted exterior rearview mirror system of claim 32, wherein, with the lighted exterior rearview mirror assembly mounted at the side of the equipped vehicle, and when the at least three illumination sources are electrically actuated with the door of the equipped vehicle locked, the light module emits light in a third pattern that is different from the first pattern and that is different from the second pattern.

34. The vehicular lighted exterior rearview mirror system of claim 25, wherein the light module comprises a housing and a light transmitting cover, and wherein the circuit board is disposed in a cavity between the housing and the light transmitting cover.

35. The vehicular lighted exterior rearview mirror system of claim 25, wherein the circuit board has circuitry established thereat, and wherein the circuitry comprises (i) the at least three illumination sources, (ii) electrical drivers for the at least three illumination sources and (iii) connector terminals.

* * * * *